(12) United States Patent
Weymann et al.

(10) Patent No.: US 11,975,721 B2
(45) Date of Patent: May 7, 2024

(54) WORK MACHINE HAVING A HYDRO-MECHANICAL DRIVE UNIT

(71) Applicant: Weidemann GmbH, Diemelsee-Flechtdorf (DE)

(72) Inventors: Max Weymann, Frankenberg (DE); Andreas Albach, Homberg/Efze (DE)

(73) Assignee: Weidemann GmbH, Diemelsee-Flechtdorf (DE)

( * ) Notice: Subject to any disclaimer, the term of this patent is extended or adjusted under 35 U.S.C. 154(b) by 0 days.

(21) Appl. No.: 17/980,091

(22) Filed: Nov. 3, 2022

(65) Prior Publication Data
US 2023/0138883 A1    May 4, 2023

(30) Foreign Application Priority Data

Nov. 4, 2021    (DE) .................. 10 2021 128 719

(51) Int. Cl.
*B60W 10/06*         (2006.01)
*B60K 11/06*         (2006.01)
(Continued)

(52) U.S. Cl.
CPC ......... *B60W 30/1843* (2013.01); *B60K 11/06* (2013.01); *B60W 10/06* (2013.01); *B60W 10/103* (2013.01); *B60W 2300/15* (2013.01); *B60W 2300/17* (2013.01); *B60W 2510/087* (2013.01); *B60W 2710/0644* (2013.01); *B60W 2710/1005* (2013.01); *F02D 2200/021* (2013.01)

(58) Field of Classification Search
CPC .. B60W 10/06; B60W 10/103; B60W 10/101; B60W 30/1843; B60W 2300/15;
(Continued)

(56) References Cited

U.S. PATENT DOCUMENTS

| 6,923,158 B2 * | 8/2005 | Kang .................. | B60W 30/194 |
| | | | 123/396 |
| 8,647,235 B2 * | 2/2014 | Thomas .......... | B60W 30/18027 |
| | | | 477/76 |

(Continued)

FOREIGN PATENT DOCUMENTS

| DE | 2629662 | 1/1977 |
| DE | 69301277 | 7/1996 |

(Continued)

*Primary Examiner* — Roger L Pang
(74) *Attorney, Agent, or Firm* — Boyle Fredrickson S.C.

(57) ABSTRACT

A mobile work machine has a drive unit for driving at least one drive element and/or a working element. The drive unit is hydromechanical drive unit with at least one internal combustion engine and hydraulic energy transmission unit with at least one hydraulic pump and a hydraulic motor. In normal operation, the motor shaft of the internal combustion engine rotates at a normal speed (n_0). Conversely, in a limit temperature operation in which a sensed actual operating temperature of the internal combustion engine or another part of the drive unit is higher than or equal to a target limit temperature (T_limit), an electrical control unit and/or electronic control unit controls the internal combustion engine in such a way that the motor shaft of the internal combustion engine rotates at a first speed (n_target) that is higher than the normal speed (n_0) of the motor shaft in normal operation.

20 Claims, 1 Drawing Sheet

(51) Int. Cl.
*B60W 10/103* (2012.01)
*B60W 30/184* (2012.01)

(58) Field of Classification Search
CPC ....... B60W 2300/17; B60W 2510/087; B60W 2710/0644; B60W 2710/1005; B60K 11/02; B60K 11/06; F16H 59/78; F02D 2200/021; B60Y 2200/41
USPC ............................ 701/54; 477/52, 68, 97, 98
See application file for complete search history.

(56) References Cited

U.S. PATENT DOCUMENTS

| | | | |
|---|---|---|---|
| 11,021,157 B2 * | 6/2021 | Jungnickel | B60W 30/1843 |
| 11,066,074 B2 * | 7/2021 | Kuras | E02F 9/2246 |
| 11,434,622 B2 * | 9/2022 | Karst | E02F 9/226 |
| 2008/0022686 A1 * | 1/2008 | Amdall | B60W 10/26 |
| | | | 180/65.265 |
| 2010/0107996 A1 | 5/2010 | Shintani et al. | |
| 2010/0286877 A1 | 11/2010 | Gerald et al. | |
| 2017/0159804 A1 | 6/2017 | Moorcroft | |

FOREIGN PATENT DOCUMENTS

| | | |
|---|---|---|
| DE | 69312397 | 1/1998 |
| DE | 60102803 | 4/2005 |
| DE | 102017220029 | 5/2019 |
| DE | 102021200039 | 8/2021 |
| DE | 102021109535 | 10/2021 |
| EP | 2584095 | 4/2013 |
| EP | 3656622 A1 | 5/2020 |

* cited by examiner

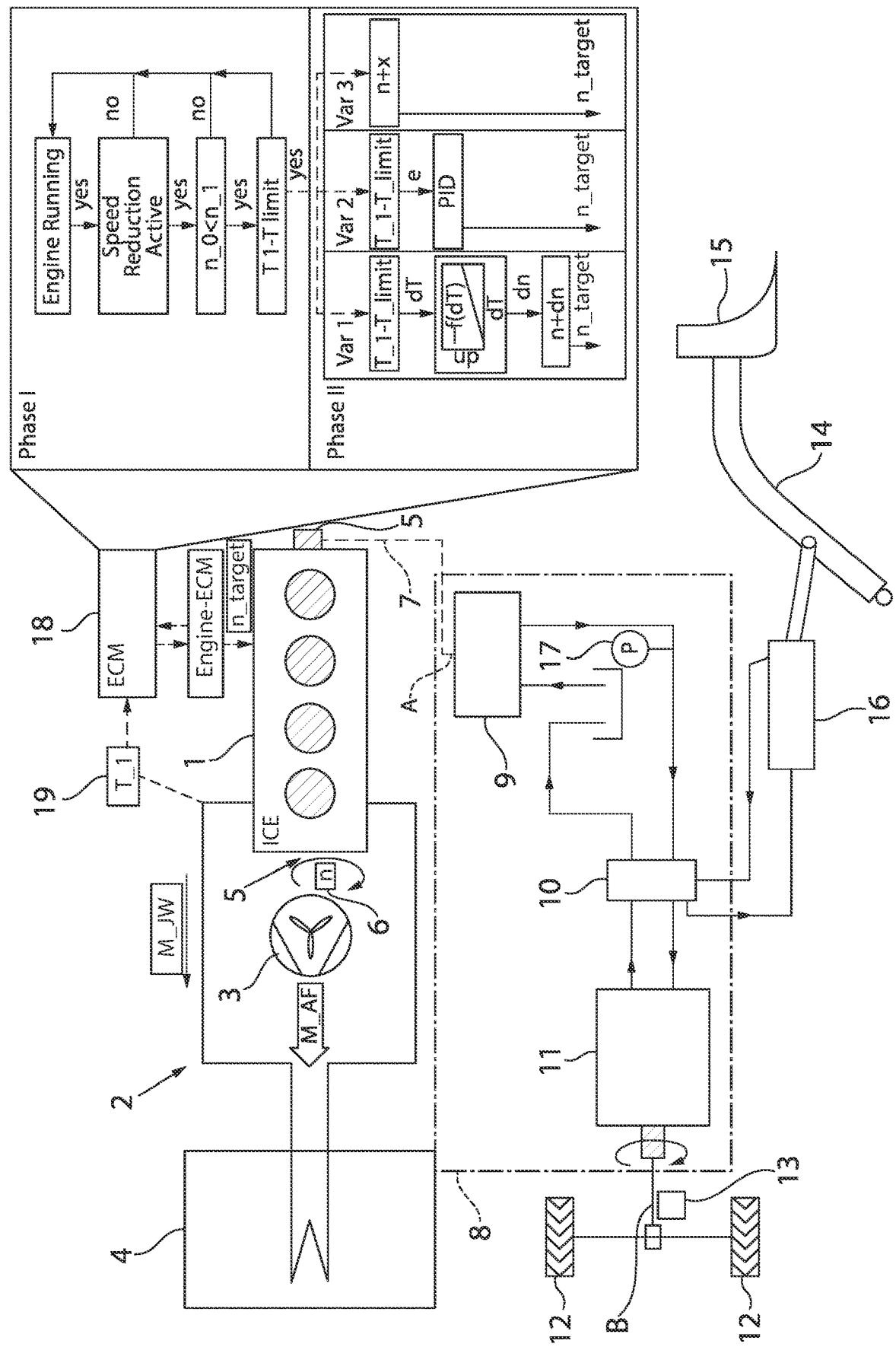

WORK MACHINE HAVING A HYDRO-MECHANICAL DRIVE UNIT

BACKGROUND OF THE INVENTION

1. Field of the Invention

The invention relates to a mobile work machine, such as a wheel loader, a telehandler, an excavator, a tractor, or a soil compaction device, with a hydromechanical drive unit powered by an internal combustion engine and, more particularly, to a work machine that controls the internal combustion engine based on a target limit temperature of the drive unit. The invention additionally relates to a method of operating such a work machine.

2. Description of the Related Art

Mobile work machines, in particular wheel loader, telehandler, excavator, tractor or the like, with a vehicle frame and with a drive unit for driving at least one drive element such as a rotor or running chain, are nowadays mostly operated with a refillable fuel. Today, mainly diesel-powered vehicles are used. In the meantime, electrically driven machines are also already in use. With the exception of, for example, wheel loaders with large buckets on the lifting arm, modern, mobile work machines often have work tools that can be detachably connected, e.g., held or released by so-called "quick hitches" or "exchange plates".

In the last few decades, for example in wheel loaders and other construction vehicles etc., essentially hydromechanical or hydrostatic drive concepts with internal combustion engines and hydraulic drive components have prevailed. As a result, the hydraulic system can be used not only for lifting and, if necessary, extending the lifting arm, esp. by means of a lifting cylinder, but also for driving the drive or rotors or drive chains, esp. by means of hydraulic motors.

The so-called "hydrostat", i.e., a hydrostatic transmission, has become a standard, especially for work or construction vehicles, such as, for example, wheel loaders, telehandlers, tractors, etc., of the lower performance classes. The power coming from the internal combustion engine is converted in these transmissions by a combination of hydraulic variable displacement pumps and hydraulic motors, which means that the range of action of the hydraulic components is very close to the performance curve of the diesel engine. Compared to the direct drive with an internal combustion engine, the hydrostatic drive can be operated at a significantly reduced diesel engine speed. This is very much in line with the way construction vehicles work, such as a loader, etc., and in recent decades has resulted in measurable fuel savings compared to previous, purely mechanical drives with internal combustion/diesel engines.

However, it has been shown that the drive system or the internal combustion engine can heat up significantly or even overheat, especially at the comparatively low rotational speeds of the internal combustion engines that are currently customary, since the cooling or fan system only provides sufficiently cool amounts of air to a limited extent. In the event that the engine or the cooling system reaches a specified, stored target limit temperature, esp. overheating temperature, an emergency shutdown or emergency operation with reduced engine power or fuel supply/injection became necessary as an overheating protection measure. In the case of these work machines or construction vehicles, the cooling air flow from the airflow is usually largely absent during normal operation. This means that the cooling or convection usually takes place almost exclusively via one or more fans and not through the air flow at high driving speeds, such as, for example, around 50 km/h or more.

Accordingly, the cooling systems or fans have hitherto been configured or dimensioned in such a way that, for example, larger heat transfer units and/or more powerful fans/drives had to be used. However, this is associated with considerable disadvantages such as, on the one hand, a higher installation space requirement and increasing costs and, on the other hand, higher noise emissions and increasing so-called "parasitic losses".

Cooling systems are also already in use in which the practice of direct mechanical coupling of the fan to the combustion engine or its motor shaft, which has been common practice for decades, has been changed in such a way that an electronic control unit, assisted by appropriate temperature sensors, adjusts the fan drive or fan speed to the cooling capacity requirement of hydraulic oil and/or coolant/cooling water.

SUMMARY OF THE INVENTION

In contrast, the object of the invention is to propose a mobile work machine which at least partially improves the disadvantages of the prior art, in particular overheating or even an emergency shutdown or emergency operation of the internal combustion engine is effectively prevented and/or is economically favorable and/or can be realized in a space-saving manner.

Starting from a mobile work machine of the type mentioned at the outset, this object is achieved by providing a work machine having a drive unit for driving at least one drive element, the drive unit being a hydrostatic drive unit having 1) at least one internal combustion engine having a motor axis for generating mechanical drive energy, and 2) at least one hydraulic energy transmission unit having at least one hydraulic fluid and a drive (A) and an output (B) with at least one hydraulic pump and a hydraulic motor for converting the mechanical drive energy into hydraulic drive energy at least for the at least one drive element, wherein the motor axis can be rotated at a speed (n). At least one of an electrical control unit and an electronic control unit is provided for controlling the drive unit. Also provided is at least one temperature sensor for detecting an actual operating temperature of the internal combustion engine. The at least one of the electrical control unit and the electronic control unit stores at least one target limit temperature of at least one of the drive unit and the internal combustion engine. In normal operation of the internal combustion engine, a motor shaft of the internal combustion engine rotates at a normal speed (n_0). Conversely, in limit temperature operation in which an actual operating temperature is higher than or equal to a target limit temperature (T_limit), the at least one of the electrical control unit and the electronic control unit controls the internal combustion engine in such a way that the motor shaft of the internal combustion engine rotates at a first speed (n_target) that is higher than the normal speed (n_0) of the motor shaft in normal operation.

Accordingly, a mobile work machine according to the invention is characterized in that, in limit temperature operation in which the actual operating temperature is higher than or equal to the target limit temperature, the electrical and/or electronic control unit controls the internal combustion engine in such a way that the motor shaft of the internal combustion engine rotates at a first speed. The first speed of the motor shaft is higher than the normal speed of the motor shaft in normal operation. Here, the normal speed within the meaning of the invention is advantageously the speed that the internal combustion engine has/had immediately before the limit temperature operation.

If there is a possible risk of overheating of the internal combustion engine, the internal combustion engine is not throttled or put into emergency operation, especially with less fuel supply, as was previously the case, but in stark contrast, the internal combustion engine or its motor shaft is accelerated and operated at higher speeds.

This represents a complete departure from what has been customary up to now and is certainly, at least at first glance, even contradictory to previous teaching or practical experience for many persons skilled in the art.

However, the invention makes use of the fact that modern internal combustion engines or diesel engines with electronic engine control have a performance curve in which the power, in particular the maximum power of the engine, no longer increases steadily with the engine speed, but where the power stagnates or even decreases in the upper speed range in some instances. Since the cooling capacity requirement of an internal combustion engine correlates with its power, use can be made of this fact now advantageously for improved cooling according to the invention. Thus, in the above-mentioned modern internal combustion engines, the higher speed of the motor shaft can be used for a higher cooling capacity or cooler speed without the engine power and thus the cooling capacity requirement changing or increasing significantly. Accordingly, the same/full power is still available to the user or the use of the mobile work machine, but with improved or stronger cooling capacity. In the case of internal combustion engines with decreasing power in the top speed range, even higher cooling capacity can be achieved with a decreasing cooling capacity requirement of the internal combustion engine.

Thus, a cooling system can be realized that is particularly efficient, space-saving, as well as structurally and economically favorable.

In a development of the invention, it is provided that, in limit temperature operation, the electrical and/or electronic control unit controls the hydraulic energy transmission unit in such a way that the first speed of the motor shaft does not affect the travel speed of the work machine and/or the drive speed of the drive element. This measure ensures that the mobile work machine does not travel faster as a result of the increase in rotational speed of the internal combustion engine according to the invention, so that there is no danger to the driver or others due to the higher travel speed. Accordingly, the mobile work machine continues to drive at the same speed by the increase in speed of the internal combustion engine according to the invention. This means that the travel speed of the mobile work machine remains essentially the same or is unchanged as in normal operation by the increase in rotational speed of the internal combustion engine according to the invention in limit temperature operation.

An advantageous decoupling of the speed of the motor shaft from the travel speed of the work machine and/or a drive speed of the drive element can be implemented by way of an advantageous decoupling gear or a decoupling unit for decoupling the motor shaft from the drive element or rotor/drive chain etc.

In a variant of the invention, the work machine is implemented in such a way that the electrical and/or electronic control unit controls the hydraulic energy transmission unit in such a way that, in limit temperature operation, a limit transmission ratio of the hydraulic energy transmission unit between the drive and output is smaller than a transmission ratio between the drive and output in normal operation. As a result, the hydraulic energy transmission unit can be designed as a decoupling gear or decoupling unit, with a separate or additional/second decoupling gear being unnecessary. This dual use of the hydraulic energy transmission unit is structurally and economically particularly favorable and also saves a considerable amount of installation space.

The drive unit may comprise at least one cooling unit for cooling the internal combustion engine and/or the cooling unit has at least one heat transfer unit for transferring waste heat from the internal combustion engine to a heat transfer medium such as cooling water and/or the cooling unit comprises at least one cooling air unit for generating a cooling air flow for cooling the internal combustion engine and/or the heat transfer medium. At least one mechanical connection unit and/or mechanical coupling unit is provided between the cooling air unit and the internal combustion engine and/or the motor shaft. This means that there is no need for a complex electronic, separate control of the cooling air unit or the fan, which, for example, increases operational reliability and, inter alia, is particularly cost-effective, and in some cases conventional or commercially available cooling systems or system components can be used for this purpose.

In an advantageous embodiment of the invention, the electrical and/or electronic control unit controls the internal combustion engine in such a way that, in limit temperature operation, the first speed is a function of the actual operating temperature. In this way, a constant change, esp. an increase in the first speed, can be provided as the actual operating temperature increases. Preferably, when the limit temperature operation is reached, the speed is raised only very slightly, so that the first speed is only slightly higher than the normal speed, and when the limit temperature operation is clearly exceeded, the speed is advantageously raised very sharply, so that the first speed is much higher than the normal speed. For example, the first speed is a linear, power and/or root function of the actual operating temperature.

In an alternative variant of the invention, the work machine is advantageously designed in such a way that the electrical and/or electronic control unit controls the internal combustion engine in such a way that, in limit temperature operation, the first speed is the sum of the normal speed plus a defined speed difference. This can be implemented in terms of control technology without great effort. For example, when the limit temperature of the normal speed is exceeded, a certain value is added so that the actual speed of the motor shaft virtually makes a "jump" and rises very quickly to a significantly higher first speed. In doing so, a jump function is implemented, virtually.

Advantageously, the electrical and/or electronic control unit comprises at least one controller, esp. a PID controller, and it controls the internal combustion engine in such a way that, in limit temperature operation, the first speed is designed as a control variable and the actual operating temperature is designed as a reference variable. In this way, an advantageous control can be implemented.

In principle, it is advantageous that in the event that the actual operating temperature drops again and/or it is again lower than or equal to the target limit temperature, the electrical and/or electronic control unit controls the internal combustion engine in such a way that the limit temperature operation is advantageously ended and/or the motor shaft of the internal combustion engine rotates again at the normal speed of the motor shaft in normal operation. Accordingly, the first speed can be reduced to the normal speed. This saves fuel and is therefore particularly environmentally friendly.

In general, in normal operation, a so-called "eco mode" or "eco operation" can be implemented, with the speed being significantly lower or lowered compared to earlier engines or the usual operating mode, for example. For this purpose, the internal combustion engine is advantageously controlled by the electrical and/or electronic control unit in such a way that it is operated in a lowering mode or in the "eco mode". This saves fuel. This is cost-effective and climate-friendly. In many cases, however, this so-called "eco mode" is already the so-called "normal operation", esp. within the meaning of the invention, since climate-friendly and fuel-saving operating modes/controls of the internal combustion engines or work machines are virtually the "normal state".

The non-lowered operation of the mobile work machine according to the invention is necessary, for example, when working with the work machine under high loads or when there is a (hydraulic) power requirement. This occurs, for example, when lifting very heavy loads with a wheel loader or telehandler, so that the hydraulic system or the hydraulic pump requires a high or full, possibly maximum, power/speed of the combustion engine and the motor shaft and thus a pump shaft of the hydraulic pump has a very high speed.

At least one charging unit, such an exhaust gas turbocharger, may be provided for compressing the engine air supplied to the internal combustion engine, and/or the internal combustion engine comprises at least one injection unit having at least one injection nozzle for injecting fuel into an engine compartment/cylinder and/or into an intake manifold and/or into an antechamber or the like. This saves fuel, improves exhaust gas quality and is therefore particularly environmentally friendly.

In principle, the invention has the following advantages individually or combined with one another:
Cost-optimal and compact design of the cooling system.
Lower losses due to the possibilities of a smaller or slower rotating fan compared to the prior art.
Reduced fan speed or smaller fan leads to lower noise emissions.
Additional protection against overheating of the combustion engine, possibly even of the travel drive.
Exploiting the usual so-called "speed reduction" without the risk of overheating the combustion engine unhindered
Before a usual monitoring of the combustion engine (manufacturer) reduces the power, the engine speed is increased by invention and the user continues to have the full power of the combustion engine at his/her disposal.
It can be prevented that there is an emergency shutdown with a note in the fault log.

In general, the invention makes advantageous use of the fact that current properties of internal combustion engines are advantageously taken into account, and it links these properties with the advantageous possibilities of electronic engine controls and/or drive controls.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING

An exemplary embodiment of the invention is shown in the drawing and is explained in more detail below with reference to the single FIGURE.

FIG. 1 shows a schematic diagram of part of a drive unit according to the invention.

DETAILED DESCRIPTION

In FIG. 1, a drive unit according to the invention is shown very schematically, with an internal combustion engine 1 or diesel engine 1 and a cooling system 2 with a fan 3 being provided. Fan 3 generates an air flow M_AF, which cools a heat transfer unit/exchanger 4 and in which a cooling medium or a cooling liquid/cooling flow M_JW for cooling diesel engine 1 is provided.

In this case, diesel engine 1 or its rotatable motor shaft 5 drives fan 3 directly, i.e., they are mechanically (rigidly) coupled. Alternatively or in combination, fan 3 can also be coupled to motor shaft 5 by means of a so-called "visco coupling", fan 3 can also be seated on motor shaft 5, fan 3 can also be mounted on a different, separate bearing or auxiliary bearing, such as, for example, a water pump etc., and/or fan 3 can also be driven by means of a belt drive or spur gear drive or the like.

Advantageously, a speed sensor 6 for detecting the speed n of motor shaft 5 and at the same time a drive shaft of fan 3 is provided.

In addition, a connection 7, esp. mechanical and/or rigid, and/or a connection 7 that can be coupled with a coupling that is not shown in detail, is to a so-called "hydrostat" 8 or hydraulic energy transmission unit 8 with a drive A and an output B. "Hydrostat" 8 comprises, inter alia, a hydraulic pump 9, which can also be flanged/arranged directly to the motor shaft 5 or the internal combustion engine 1 (without further illustration). The hydraulic pump pumps hydraulic fluid or oil under pressure p, which can preferably be detected with a pressure sensor 17, to a control block 10 or a hydraulic valve device 10 and finally to a hydraulic motor 11, which drives rotors/drive wheels 12. Another speed sensor 13 for detecting the drive speed is advantageously provided at output B.

Furthermore, a lifting arm 14 with bucket 15 is shown as an example and very schematically. A hydraulic cylinder 16 pivots or adjusts the lifting arm 14 and is hydraulically connected to control block 10 or can be pressurized. The person skilled in the art knows how this can be implemented and actuated in work/construction machines with tools or lifting arm 14 with bucket 15 or the like and other components, not shown in detail, such as lifting cylinders etc. and/or with hydraulic steering.

In an advantageous embodiment of the invention, cooling system 2 is designed, especially with performance characteristics of modern internal combustion engines 1 and to avoid the described risk of overheating at reduced speed n_0, e.g. so-called "eco mode", is advantageously reduced in that, for example, an engine outlet temperature T_1 is advantageously monitored with a temperature sensor 19 and fed to an electronic control device ECM or control unit 18 according to the invention. If internal combustion engine 1 is in an operating state with a reduced speed n_0, e.g., in ECO25 mode, and/or with an actual speed that is lower than the maximum speed n_max, an algorithm, for example, advantageously ensures that the engine speed n is increased.

As a result, speed n of fan 3 also increases and the forced convection at the heat transfer unit 4 is increased, so that there is better heat transfer from the engine cooling water (so-called "jacket water") to the cooling air. This lowers the temperature at the engine outlet.

FIG. 1, on the one hand, depicts the relevant components in a schematic, and on the other, illustrates schematically a possible advantageous flow of such an algorithm as an example which is implemented advantageously on an Electronic Control Module ECM or a control unit 18 according to the invention.

In phase I, that is to say in so-called normal operation within the meaning of the invention, the operating state of internal combustion engine 1 is queried. The transition from phase I to phase II is advantageously linked to conditions which are intended to ensure advantageously that as far as possible no unwanted intervention and thus also no adverse effect on the engine speed n takes place. For example, it is checked whether, inter alia, engine 1 is running, whether a speed reduction of engine 1 is active, e.g., so-called "ECO mode", whether an actual speed n_0 is actually below a so-called rated speed n_1 or whether the actual speed n_0 is lower than the maximum speed n_max, and/or whether the engine outlet temperature T_1 exceeds a temperature limit T_limit to be specified.

If these advantageous conditions and possibly also other advantageous conditions are met, the transition to phase II takes place advantageously, i.e., to a limit temperature operation within the meaning of the invention, in which the advantageous influencing/changing of the speed n of motor shaft 5 according to the invention takes place or is realized.

In principle, a variety of possibilities are conceivable as to how the speed n can be influenced. By way of example, three advantageous variants are outlined below and schematically or roughly in FIG. 1. The sketch shown on the right in FIG. 1 is advantageously understood in such a way that only one line is used:

Variant 1 or "Var 1": First, advantageously, a difference between the engine outlet temperature T_1 and the limit value T_limit is formed. Since T_1>T_limit, there is resulting a positive difference dT. This difference dT serves as an input signal for a characteristics map or mathematical function or a mathematical operation that can be implemented in another way, which establishes a relationship between dT and a desired engine speed increase dn, which can be expressed as dn=f(dT). f(dT) can have any different characteristics. In the last step, for example, the actual engine speed n is added to dn and a new, increased target speed n_target is thus generated, which is then implemented by means of control unit ECM, 18, i.e., engine 1 or its fuel supply etc. is controlled/changed in such a way that its actual speed n is equal to the generated target speed n_target.

Variant 2 or "Var 2": Here, too, advantageously, a difference is first formed, the result of which can be referred to as control deviation e. This control deviation e serves as an input signal for a digital controller, for example in the form of a PID controller. Its output in turn describes the new target speed n_target, with which motor 1 is controlled and operated in the above-mentioned manner.

Variant 3 or "Var 3": Here, advantageously, a summand x to be defined is added to the actual speed in order to generate a new target speed n_target, with which motor 1 is controlled and operated in the above-mentioned manner. In this variant, several, for example, three temperature ranges, each with different summands x, i.e., summands x1, x2, x3, xN of different sizes, can advantageously be provided, so that, for example, when temperature T_1 increases, the intervention and cooling is different, i.e., more massive. This essentially corresponds to a kind of "jump function".

No matter which of the advantageous variants is used, in the end the flow affects the actual speed n in such a way that it is increased according to the invention, namely to the target speed n_target according to the invention (cf. FIG. 1).

In general, in addition to the structural and material properties of heat transfer units 4 of the work machine, the mass flows (internally and externally) in particular can be important for the heat that can be transferred. For example, the higher the airside mass flow, with the same input temperature, the higher the heat that can be transferred. In mobile work machines, the convection at heat transfer unit 4 is often forced by one or more fans 3. With a mechanical drive, the speed n of fan 3 is always dependent on the engine speed n.

The invention claimed is:

1. A mobile work machine comprising:
a support frame;
a drive unit for driving at least one drive element, the drive unit being a hydrostatic drive unit having 1) at least one internal combustion engine having a motor axis for generating mechanical drive energy, and 2) at least one hydraulic energy transmission unit having at least one hydraulic fluid and a drive (A) and an output (B) with at least one hydraulic pump and a hydraulic motor for converting the mechanical drive energy into hydraulic drive energy at least for the at least one drive element, wherein the motor axis can be rotated at a speed (n), wherein at least one of an electrical control unit and an electronic control unit is provided for controlling the drive unit;
at least one temperature sensor for detecting an actual operating temperature of the drive unit; wherein the at least one of the electrical control unit and the electronic control unit stores at least one target limit temperature of the drive unit, wherein, in normal operation of the internal combustion engine, a motor shaft of the internal combustion engine rotates at a normal speed (n_0), wherein, in limit temperature operation in which an actual operating temperature is higher than or equal to a target limit temperature (T_limit), the at least one of the electrical control unit and the electronic control unit controls the internal combustion engine in such a way that the motor shaft of the internal combustion engine rotates at a first speed (n_target), and wherein the first speed (n_target) of the motor shaft is higher than the normal speed (n_0) of the motor shaft in normal operation;
wherein, in limit temperature operation, the at least one of the electrical control unit and the electronic control unit controls the hydraulic energy transmission unit in such a way that the first speed (n_target) of the motor shaft does not affect a travel speed of the work machine and/or a drive speed of the drive element.

2. The work machine according to claim 1, wherein the at least one of the electrical control unit and the electronic control unit controls the hydraulic energy transmission unit in such a way that, in limit temperature operation, a limit transmission ratio of the hydraulic energy transmission unit between drive (A) and output (B) is smaller than a transmission ratio between drive (A) and output (B) in normal operation.

3. The work machine according to claim 1, wherein the drive unit comprises at least one cooling unit for cooling the internal combustion engine.

4. The work machine according to claim 3, wherein the cooling unit has at least one of 1) at least one heat transfer unit for transferring waste heat from the internal combustion engine to a heat transfer medium and 2) at least one cooling air unit for generating a cooling air flow for cooling at least one of the internal combustion engine and the heat transfer medium.

5. The work machine according to claim 4, further comprising at least one mechanical connection unit between the cooling air unit and at least one of the internal combustion engine and the motor shaft.

6. The work machine according to claim 1, wherein the at least one of the electrical control unit and the electronic control unit controls the internal combustion engine in such a way that, in limit temperature operation, the first speed (n_target) is a function of the actual operating temperature.

7. The work machine according to claim 1, wherein the at least one of the electrical control unit and the electronic control unit controls the internal combustion engine in such a way that, in limit temperature operation, the first speed (n_target) is the sum of the normal speed (n_0) plus a defined speed difference (x).

8. The work machine according to claim 1, wherein the at least one of the electrical control unit and the electronic control unit comprises at least one PID controller that controls the internal combustion engine in such a way that, in limit temperature operation, the first speed (n_target) is designed as a control variable and the actual operating temperature is designed as a reference variable.

9. The work machine according to claim 1, further comprising at least one exhaust gas turbocharger that is configured to compress engine air supplied to the internal combustion engine.

10. The work machine according to claim 1, wherein the internal combustion engine comprises at least one injection unit having at least one injection nozzle for injecting fuel into at least one of an engine cylinder, an intake manifold, and an antechamber.

11. The mobile work machine according to claim 1, wherein the mobile work machine comprises one of a wheel loader, a telehandler, an excavator, a tractor, and a soil compaction device.

12. The mobile work machine according to claim 1, wherein the temperature sensor detects a temperature of the internal combustion engine, and wherein the target limit temperature is a temperature of the internal combustion engine.

13. A method for operating a work machine, the work machine comprising a support frame, a drive unit for driving at least one drive element, the drive unit being a hydrostatic drive unit having 1) at least one internal combustion engine having a motor axis for generating mechanical drive energy, and 2) at least one hydraulic energy transmission unit having at least one hydraulic fluid and a drive (A) and an output (B) with at least one hydraulic pump and a hydraulic motor for converting the mechanical drive energy into hydraulic drive energy at least for the at least one drive element, wherein the motor axis can be rotated at a speed (n), wherein at least one of an electrical control unit and an electronic control unit is provided for controlling the drive unit, at least one target limit temperature of the drive unit being stored in at the at least one of the electrical control unit and the electronic control unit; the method comprising:
using at least one temperature sensor, detecting an actual operating temperature of the drive unit;
using the at least one of the electrical control unit and the electronic control unit, causing a motor shaft of the internal combustion engine to rotate at a normal speed (n_0) during normal operation of the internal combustion engine;
in a limit temperature operation of the detected temperature of the drive unit is higher than or equal to a target limit temperature (T_limit), operating at least one of the electrical control unit and the electronic control unit to control the internal combustion engine in such a way that the motor shaft of the internal combustion engine rotates at a first speed (n_target), and wherein the first speed (n_target) of the motor is higher than the normal speed (n_0) of the motor shaft in normal operation of the internal combustion engine; and
in the limit temperature operation, operating at least one of the electrical control unit and the electronic control unit to control the hydraulic energy transmission unit in such a way that a limit transmission ratio of the hydraulic energy transmission unit between drive (A) and output (B) is smaller than a transmission ratio between drive (A) and output (B) in normal operation.

14. The method according to claim 13, wherein the sensed temperature sensor and the target temperature limits are temperatures of the internal combustion engine.

15. A mobile work machine comprising:
a support frame;
a drive unit for driving at least one drive element, the drive unit being a hydrostatic drive unit having 1) at least one internal combustion engine having a motor axis for generating mechanical drive energy, and 2) at least one hydraulic energy transmission unit having at least one hydraulic fluid and a drive (A) and an output (B) with at least one hydraulic pump and a hydraulic motor for converting the mechanical drive energy into hydraulic drive energy at least for the at least one drive element, wherein the motor axis can be rotated at a speed (n), wherein at least one of an electrical control unit and an electronic control unit is provided for controlling the drive unit; and
at least one temperature sensor for detecting an actual operating temperature of the drive unit; wherein the at least one of the electrical control unit and the electronic control unit stores at least one target limit temperature of the drive unit, wherein, in normal operation of the internal combustion engine, a motor shaft of the internal combustion engine rotates at a normal speed (n_0), wherein, in limit temperature operation in which an actual operating temperature is higher than or equal to a target limit temperature (T_limit), the at least one of the electrical control unit and the electronic control unit controls the internal combustion engine in such a way that the motor shaft of the internal combustion engine rotates at a first speed (n_target), and wherein the first speed (n_target) of the motor shaft is higher than the normal speed (n_0) of the motor shaft in normal operation;
wherein the at least one of the electrical control unit and the electronic control unit controls the internal combustion engine in such a way that, in limit temperature operation, the first speed (n_target) is the sum of the normal speed (n_0) plus a defined speed difference (x).

16. The work machine according to claim 15, wherein, in limit temperature operation, the at least one of the electrical control unit and the electronic control unit controls the hydraulic energy transmission unit in such a way that the first speed (n_target) of the motor shaft does not affect a travel speed of the work machine and/or a drive speed of the drive element.

17. The work machine according to claim 15, wherein the at least one of the electrical control unit and the electronic control unit controls the internal combustion engine in such a way that, in limit temperature operation, the first speed (n_target) is a function of the actual operating temperature.

18. The work machine according to claim 15, wherein the at least one of the electrical control unit and the electronic control unit comprises at least one PID controller that controls the internal combustion engine in such a way that, in limit temperature operation, the first speed (n_target) is designed as a control variable and the actual operating temperature is designed as a reference variable.

19. The work machine according to claim 15, wherein the drive unit comprises at least one cooling unit for cooling the internal combustion engine; and wherein the cooling unit has at least one of 1) at least one heat transfer unit for transferring waste heat from the internal combustion engine to a heat transfer medium and 2) at least one cooling air unit for generating a cooling air flow for cooling at least one of the internal combustion engine and the heat transfer medium.

20. The mobile work machine according to claim 15, wherein the temperature sensor detects a temperature of the internal combustion engine, and wherein the target limit temperature is a temperature of the internal combustion engine.

* * * * *